(12) United States Patent
Kane

(10) Patent No.: US 7,130,052 B1
(45) Date of Patent: Oct. 31, 2006

(54) REAL-TIME MEASUREMENT OF ULTRASHORT LASER PULSES

(75) Inventor: Daniel James Kane, Santa Fe, NM (US)

(73) Assignee: Daniel J. Kane, Santa Fe, NM (US)

( * ) Notice: Subject to any disclaimer, the term of this patent is extended or adjusted under 35 U.S.C. 154(b) by 292 days.

(21) Appl. No.: 10/808,010

(22) Filed: Mar. 24, 2004

(51) Int. Cl.
*G01B 9/02* (2006.01)

(52) U.S. Cl. ..................................... 356/450
(58) Field of Classification Search ............... 356/450, 356/451
See application file for complete search history.

(56) References Cited

U.S. PATENT DOCUMENTS

| | | | |
|---|---|---|---|
| 5,530,544 A | 6/1996 | Trebino | |
| 5,642,161 A * | 6/1997 | Jefferson | 348/186 |
| 5,754,292 A | 5/1998 | Kane | |
| 6,008,899 A | 12/1999 | Trebino | |
| 6,219,142 B1 | 4/2001 | Kane | |
| 6,504,612 B1 | 1/2003 | Trebino | |
| 6,570,704 B1 * | 5/2003 | Palese | 359/349 |

OTHER PUBLICATIONS

Kane, "Real-time inversion of polarization gate frequency-resolved optical gating spectrograms," Applied Optics, Feb. 20, 2003, pp. 1140-1144, vol. 42.
Kane, "Real Time Inversion of Polarization-Gate FROG Traces," Ultrafast Optics, Jul. 1999, Ascona, Switzerland.
Kane, "Recent Progress Toward Real-Time Measurement of Ultrashort Laser Pulses," IEEE Journal of Quantum Electronics, Apr. 1999, pp. 421-431, vol. 35.
Kane, "Real-Time Measurement of Ultrashort Laser Pulses Using . . . ," IEEE Journal. of Selected Topics in Quantum Electronics, Mar./Apr. 1998, pp. 278-284, vol. 4.
Trebino, "Measuring ultrashort laser pulses in the time-frequency domain . . . ," Review of Scientific Instruments, Sep. 1997, pp. 3277-3295, vol. 68.
Kane, "Simultaneous measurement of two ultrashort laser pulses from a single spectrogram," Journal of the Optical Society of America, Apr. 1997, pp. 935-943, vol. 14.
DeLong, "Pulse retrieval in frequency-resolved optical gatin based on the method of generalized projections," Optics Letters, Dec. 15, 1994, pp. 2152-2154 vol. 19.
DeLong, "Improved ultrashort pulse-retrieval algorithm for frequency resolved optical gating," Journal of the Optical Society of America, Sep. 1994, pp. 2429-2437, vol. 11.
Kane, "Convergence test for inversion of frequency-resolved optical gating spectrograms," Optics Letters, Aug. 15, 2000, pp. 1216-1218, vol. 25.
Chilla, "Direct determination of the amplitude and the phase of femtosecond light pulses," Optics Letters, Jan. 1, 1991, pp. 39-41, vol. 16.
Dorrer, "Simultaneous temporal characterization of telecommunication optical pulses and modulators . . . ," Optics Letters, Aug. 1, 2002, pp. 1315-1317, vol. 27.

* cited by examiner

*Primary Examiner*—Gregory J. Toatley, Jr.
*Assistant Examiner*—Michael A. Lyons

(57) ABSTRACT

A real-time FROG system provides ultra fast pulse measurement and characterization. The system includes direct, integrated feedback that measures how well the system is retrieving pulses and tracking changes in the pulse train. This feedback is provided in real time and may be in the form of the FROG trace error, the display of the measured and retrieved FROG trace, accuracy of background subtraction or other quality measurement. The system includes preprocessing options that can be used to adjust the dynamic range of the measured signal or to perform different types of filtering. The preprocessing of the FROG trace precedes phase retrieval processing and improves the quality of pulse retrieval.

25 Claims, 7 Drawing Sheets

REAL-TIME MEASUREMENT OF ULTRASHORT LASER PULSES

BACKGROUND OF THE INVENTION

1. Field of the Invention

The present invention relates to a method and apparatus for the real-time measurement of ultrashort laser pulses based on frequency-resolved optical gating (FROG).

2. Background Art

Ultrashort optical pulses have very short time durations, typically less than a few 10's of picoseconds. As a result, ultrashort optical pulses are spectrally broad. Because the index of refraction of materials is a function of wavelength, different wavelengths of light travel at different speeds in optical materials causing the properties of ultrashort optical pulses to change as they propagate. The shape of the pulse can influence how the pulse itself interacts with materials, further complicating the analysis of ultrashort optical pulse transmission and propagation. Ultrafast laser pulse measurement tries to obtain both the intensity profile of the pulse as well as the "phase of the pulse," which is the actual variation of the frequencies that make up the pulse.

Generally, time resolved measurements of events use shorter events to resolve variations in the characteristics of the events as a function of time. Unfortunately for the analysis of ultrashort optical pulses, shorter events do not exist and modern electronics are insufficiently fast to allow for direct time resolved measurements. One effective measurement technique for ultrashort optical pulses is called "frequency-resolved optical gating" or FROG. FROG is based on the observation that an optically formed spectrogram contains all of the information about the pulse to be measured. A two-dimensional phase retrieval process extracts the pulse from its spectrogram. The main disadvantage of frequency-resolved optical gating is that the pulse extraction using phase retrieval can be slow, which is undesirable for real-time applications. Aspects of the present invention allow FROG to be implemented as a real-time pulse measurement technique that is both accurate and fast.

Mathematical Representation of an Optical Pulse

The mathematical representation of ultrashort optical pulses is discussed to provide background for the discussion of the FROG technique. The time-dependent variations of an optical pulse are embodied in the pulse's electric field, A(t), which can be written:

$$A(t)=Re[E(t)e^{i\omega_0 t}] \quad (1)$$

where $\omega_0$ is the carrier frequency and Re refers to the real part. A(t) can be used in this form for calculations, but it is generally easier to work with a different representation that removes the rapidly varying $\omega_0$ part, $e^{i\omega_0 t}$, and uses as a representation a slowly varying envelope together with a phase term that contains only the frequency variations. This representation, which does not include the rapidly varying carrier frequency, is $$E(t)=[I(t)]^{1/2}e^{i\phi(t)} \quad (2)$$

where I(t) and $\phi(t)$ are the time-dependent intensity and phase of the pulse. (E(t) is complex.) The frequency variation, $\Omega(t)$, is the derivative of $\phi(t)$ with respect to time:

$$\Omega(t)=-d\phi(t)/dt \quad (3)$$

The pulse field can be written equally well in the frequency domain by taking the Fourier transform of equation 2:

$$\tilde{E}(\omega)=[\tilde{I}(\omega)]^{1/2}e^{i\phi(\omega)} \quad (4)$$

where $\tilde{I}(\omega)$ is the spectrum of the pulse and $\phi(\omega)$ is its phase in the frequency domain. The spectral phase contains time versus frequency information. That is, the derivative of the spectral phase with respect to frequency yields the time arrival of the frequency, or the group delay.

Obtaining the intensity and phase, I(t) and $\phi(t)$ (or $\tilde{I}(\omega)$ and $\phi(\omega)$) is called full characterization of the pulse. Common phase distortions include linear chirping, where the phase (either in the time domain or frequency domain) is parabolic. When the frequency increases with time, the pulse is said to have positive linear chirp; negative linear chirp is when the high frequencies lead the lower frequencies. Higher order chirps are common, but for these, differentiation between spectral and temporal chirp is required because spectral phase and temporal phase are not interchangeable.

Frequency-Resolved Optical Gating

Frequency-resolved optical gating (FROG) measures the spectrum of a particular temporal component of an optical pulse, shown in FIG. 1, by spectrally resolving the signal pulse in an autocorrelation-type experiment using an instantaneously responding nonlinear medium. As shown in FIG. 1, FROG involves splitting a pulse and then overlapping the two resulting pulses in an instantaneously responding $X^{(3)}$ or $X^{(2)}$ medium. Any medium that provides an instantaneous nonlinear interaction may be used to implement FROG. Perhaps the most intuitive is a medium and configuration that provides polarization gating.

For a typical polarization-gating configuration, induced birefringence due to the electronic Kerr effect is the nonlinear-optical interaction. The "gate" pulse causes the $X^{(3)}$ medium, which is placed between two crossed polarizers, to become slightly birefringent. The polarization of the "gated" probe pulse (which is cleaned up by passing through the first polarizer) is rotated slightly by the induced birefringence allowing some of the "gated" pulse to leak through the second polarizer. This is referred to as the signal Because most of the signal emanates from the region of temporal overlap between the gate pulse and the probe pulse, the signal pulse contains the frequencies of the "gated" probe pulse within this overlap region. The signal is then spectrally resolved, and the signal intensity is measured as a function of wavelength and delay time $\tau$. The resulting trace of intensity versus delay and frequency is a spectrogram, a time- and frequency-resolved transform that intuitively displays the time-dependent spectral information of a waveform.

The resulting spectrogram can be expressed as:

$$S_E(\omega,\tau)=|\int_{-\infty}^{\infty}E(t)g(t-\tau)e^{-i\omega t}dt|^2 \quad (9)$$

where E(t) is the measured pulse's electric field, g(t–$\tau$) is the variable-delay gate pulse, and the subscript E on $S_E$ indicates the spectrogram's dependence on E(t). The gate pulse g(t) is usually somewhat shorter in length than the pulse to be measured, but not infinitely short. This is an important point: an infinitely short gate pulse yields only the intensity I(t) and conversely a CW gate yields only the spectrum I($\omega$). On the other hand, a finite-length gate pulse yields the spectrum of all of the finite pulse segments with duration equal to that of the gate. While the phase information remains lacking in each of these short-time spectra, having spectra of an infinitely large set of pulse segments compensates this deficiency. The spectrogram nearly uniquely determines both the intensity I(t) and phase $\phi(t)$ of the pulse, even if the gate pulse is longer than the pulse to be measured. If the gate is too long, sensitivity to noise and other practical problems arise.

In FROG, when using optically induced birefringence as the nonlinear effect, the signal pulse is given by:

$$E_{sig}(t,\tau) \propto E(t)|E(t-\tau)|^2 \quad (10)$$

So the measured signal intensity $I_{FROG}(\omega,\tau)$, after the spectrometer is:

$$I_{FROG}(\omega,\tau) = |\int_{-\infty}^{\infty} E(t)|E(t-\tau)|^2 e^{-i\omega t} dt|^2 \quad (11)$$

The FROG trace is thus a spectrogram of the pulse E(t) although the gate, $|E(t-\tau)|^2$, is a function of the pulse itself.

FROG is not limited to the optical Kerr effect. Second harmonic generation (SHG) FROG can be constructed to analyze relatively weak pulses from oscillators and is typically more sensitive than polarization-gating FROG. For SHG FROG, the pulse is combined with a replica of itself in an SHG crystal as illustrated in FIG. 2.

To see that the FROG trace essentially uniquely determines E(t) for an arbitrary pulse, note that E(t) is easily obtained from $E_{sig}(t, \tau)$. Equation (11) can then be written in terms of $E_{sig}(t, \Omega)$, the Fourier transform of the signal field $E_{sig}(t, \tau)$ with respect to delay variable $\tau$. This gives the following, apparently more complex, expression:

$$I_{FROG}(\omega,\tau) = |\int_{-\infty}^{\infty} E_{sig}(t,\Omega) e^{-i\omega t - i\Omega\tau} dt d\Omega|^2 \quad (12)$$

Equation (12) indicates that the problem of inverting the FROG trace $I_{FROG}(\omega, \tau)$ to find the desired quantity $E_{sig}(t, \tau)$ is that of inverting the squared magnitude of the two-dimensional (2-D) Fourier transform of $E_{sig}(t, \tau)$. This problem, which is called the 2-D phase-retrieval problem, is well known in many fields, especially in astronomy, where the squared magnitude of the Fourier transform of a 2-D image is often measured. At first glance, this problem appears unsolvable; after all, much information is lost when the magnitude is taken. The 1-D phase retrieval problem is known to be unsolvable (for example, infinitely many pulse fields give rise to the same spectrum). Intuition fails badly in this case, however. Two- and higher-dimension phase retrieval processes essentially always yield unique results.

FROG Inversion

An iterative 2-D phase retrieval process is used to extract the pulse information from the measured FROG trace as illustrated generally in FIG. 3. This phase retrieval process converges to a pulse that minimizes the difference between the measured and the calculated FROG trace. Application of this phase retrieval process to FROG has been problematic in the past. Some recent applications use a generalized projections algorithm, which converges quickly, along with faster computers, to track pulse changes at rates of 20 Hz or greater, making FROG a real-time pulse measurement technique. Indeed, programs for analyzing FROG traces are commercially available.

The original FROG inversion process, using what is commonly referred to as the vanilla algorithm, is simple and iterates quickly. On the other hand, the process tends to stagnate and give erroneous results, especially for geometries that use a complex gate function such as SHG or self-diffraction. Improved strategies using different algorithms, including brute force minimization, were developed to avoid stagnation, at the expense of both iteration speed and convergence time. Later a numerical technique called generalized projections brought a significant advance in both speed and stability. The generalized projections technique proceeds after an iteration by constructing a projection that minimizes the error (distance) between the FROG electric field, $E_{sig}(t, \tau)$, obtained immediately after the application of the intensity constraint, and the FROG electric field calculated from the mathematical form constraint. The projection constructed in this manner is used as the starting point of the next iteration.

The first implementations of the generalized projections technique used a standard minimization procedure to find the electric field for the next iteration (which can still be slow). For the most common FROG geometries, PG and SHG, there are substantial advantages to a different strategy that directly determines the starting point for the next iteration. This strategy, called Principal Components Generalized Projections (PCGP), converts the generalized projections technique into an eigenvector problem. The PCGP technique has achieved pulse characterization rates of 20 Hz.

The goal of phase retrieval is to find the E(t) that satisfies two constraints. The first constraint is the FROG trace itself which is the magnitude squared of the 1D Fourier transform of $E_{sig}(t,\tau)$:

$$I_{FROG}(\omega,\tau) = |\int_{-\infty}^{\infty} E_{sig}(t,\tau) e^{-i\omega t} dt|^2 \quad (13)$$

The other constraint is the mathematical form of the signal field, $E_{sig}(t,\tau)$, for the nonlinear interaction used. The mathematical forms for a variety of FROG beam geometries are:

$$E_{sig}(t,\tau) \propto \begin{cases} E(t)|E(t-\tau)|^2 & \text{PG FROG} \\ E(t)^2 E^*(t-\tau) & \text{SD FROG} \\ E(t)E(t-\tau) & \text{SHG FROG} \\ E(t)^2 E(t-\tau) & \text{THG FROG} \end{cases} \quad (14)$$

where PG is polarization gate, SD is self-diffraction, SHG is second harmonic generation and THG is third harmonic generation FROG.

All FROG implementations work by iterating between two different data sets: the set of all signal fields that satisfy the data constraint, $I_{FROG}(\omega, \tau)$, and the set of all signal fields that satisfy equation 14. The difference between FROG implementations is how the iteration between the two sets is completed. In the case of generalized projections, the E(t)'s are chosen such that the distance between the E(t) on the magnitude set and the E(t) on the mathematical form set is minimized. This is accomplished by minimizing the following equation:

$$z = \sum_{i,j=1}^{N} |E_{sig(DC)}^{(k)}(t_i,\tau_j) - E_{sig(MF)}^{(k+1)}(t_i,\tau_j)|^2 \quad (15)$$

where $E_{sig(DC)}^{(k)}(t_i,\tau_j)$ is the signal field generated by the data constraint, and $E_{sig(MF)}^{(k+1)}(t_i,\tau_j)$ is the signal field produced from one of the beam geometry equations 14. For the normal generalized projections technique, the minimization proceeds using a standard steepest decent algorithm; the derivative of Z with respect to the signal field is computed to determine the direction of the minimum. The computation of the derivatives is tedious; the derivatives are tabulated in, for example, Trebino, et al, *Rev. Sci Instrum.*, 68, p. 3277 (1997).

An alternative to the minimization of equation 15 is principal components generalized projections (PCGP). PCGP computes the starting point of the next iteration through an eigenvector problem, reducing the computation for the next iteration to simple matrix-vector multiplies.

PCGP works for both the PG and SHG beam geometries, is simple to program and is fast, as described in D. J. Kane, *IEEE J. Quant. Elec.*, (1999).

Self Checks in FROG Measurements

Unlike other pulse measurement techniques, FROG can provide a great deal of feedback about both the quality of the measurement (systematic errors) and the quality of the technique's performance. A good check for convergence is the FROG trace error together with a visual comparison between the retrieved FROG trace and the measured FROG trace. The FROG trace error is given by:

$$G = \sqrt{\frac{1}{N^2} \sum_{i,j=1}^{N} |I_{FROG}(\omega_i, \tau_j) - \alpha I_{FROG}^{(k)}(\omega_i, \tau_j)|^2} \quad (16)$$

where $\alpha$ is a renormalization constant, $I_{FROG}$ is the measured FROG trace and $I_{FROG}^{(k)}(\omega, \tau)$ is computed from the retrieved electric field. Typically, the FROG trace error of a PG measurement should be less than 2% for a 64×64 pixel trace, while the FROG trace error of a 64×64 pixel SHG FROG trace should be about 1% or less. Acceptable FROG trace errors decrease as FROG trace size increases and increase for smaller FROG traces. These values are only guidelines and variations are expected in specific circumstances. For example, acceptable phase retrievals of large and very complicated FROG traces can produce larger FROG trace errors.

In a good FROG measurement, the spectrum of the retrieved pulse should faithfully reproduce the salient features of the pulse's measured spectrum. SHG FROG even provides an additional check called the frequency marginal. The sum of an SHG FROG trace along the time axis yields the autoconvolution of the pulse's spectrum providing two ways the FROG measurement can be checked. First, the autoconvolution of an independently measured spectrum can be compared to the sum of the FROG trace along the time axis (the frequency marginal) providing an indication of how well the measurement was made. For example, if the doubling crystal was too thick in the pulse measurement, the FROG trace's frequency marginal will be narrower than the autoconvolution of the measured spectrum. Second, comparing the autoconvolution of the retrieval pulse spectrum with the FROG trace marginal can provide a test of convergence in addition to a test of the measurement. Phase matching problems show up as a mismatch between the FROG trace marginal and the autoconvolution of the retrieved spectrum.

Because FROG is a spectrally resolved autocorrelation, summing any FROG trace along the frequency axis yields the autocorrelation of the measured pulse. This autocorrelation can be compared to an independently measured autocorrelation, or a comparison can be made between the frequency sum of the FROG trace and the autocorrelation calculated from the retrieved pulse to determine algorithm convergence and the quality of the measurement.

Making FROG Real-Time

In order to make FROG a real-time pulse measurement technique, the FROG device, the data acquisition, the 2-D phase retrieval process, and the user interface are integrated. One real-time ultrashort laser pulse measurement implementation combined a multishot FROG device with two digital signal processing (DSP) boards in a fast personal computer. This implementation is described in D. J. Kane, *IEEE J. Quant. Elec.*, (1999). One DSP card was devoted to data acquisition and the other DSP card was used to make the calculations.

The DSP implementation was considered expensive for some applications and so efforts were directed to develop a FROG-based ultrashort laser pulse measurement that did not use DSP cards. One implementation that did not use a DSP, called VideoFROG, used a standard CCD video camera to acquire the FROG trace and a standard computer frame grabber to digitize the video signal. The computer displayed the resulting FROG trace and resized and conditioned the FROG trace for the phase retrieval process. The computer also was the user interface, displaying the retrieved pulse and the raw video image. VideoFROG used the PCGP phase retrieval process, which generally converges well. Consequently, no provision was made to detect stagnation or other faults in the phase retrieval process.

SUMMARY OF THE PREFERRED EMBODIMENTS

A preferred implementation may include a real-time pulse measurement device that has direct, integrated feedback that measures how well the device is retrieving pulses and tracking changes in the pulse train. This feedback may be in the form of the FROG trace error, the display of the measured and retrieved FROG trace, or another display or algorithm that can be used to provide information about the quality of the measurement.

According to one aspect, the present invention may provide a method for real-time measurement of ultrashort laser pulses comprising recording in a computer measured frequency resolved optical gating (FROG) trace data, the FROG trace data generated by processing a pulse in a FROG device. The method continues by processing the measured FROG trace to perform real time phase retrieval and to generate in real time a retrieved pulse from the measured FROG trace. The retrieved pulse is displayed. A feedback parameter is generated in real time to provide information on the functioning of the real time phase retrieval.

According to another aspect, the present invention may provide a method of performing real time phase retrieval processing of frequency resolved optical gating (FROG) traces. The method comprises receiving as input a measured FROG trace data set, the FROG trace data set generated by processing a pulse in a FROG device and processing the measured FROG trace data set to perform real time phase retrieval and generating in real time a retrieved pulse from the measured FROG trace. Displays of the retrieved pulse are preferably generated at a rate of three Hertz or faster. A feedback parameter provides information characterizing the real time phase retrieval.

A method of performing real time phase retrieval processing of frequency resolved optical gating (FROG) traces, the method comprising receiving as input a measured FROG trace data set created by processing a pulse in a FROG device. The method includes processing the measured FROG trace data set to perform real time phase retrieval and generating in real time a retrieved pulse from the measured FROG trace. Real time displays are generated of the retrieved pulse. The method also includes generating in real time a feedback parameter providing information characterizing the real time phase retrieval and performing a control operation in response to the feedback parameter.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention.

DESCRIPTION OF THE PREFERRED EMBODIMENTS

Figure 1:
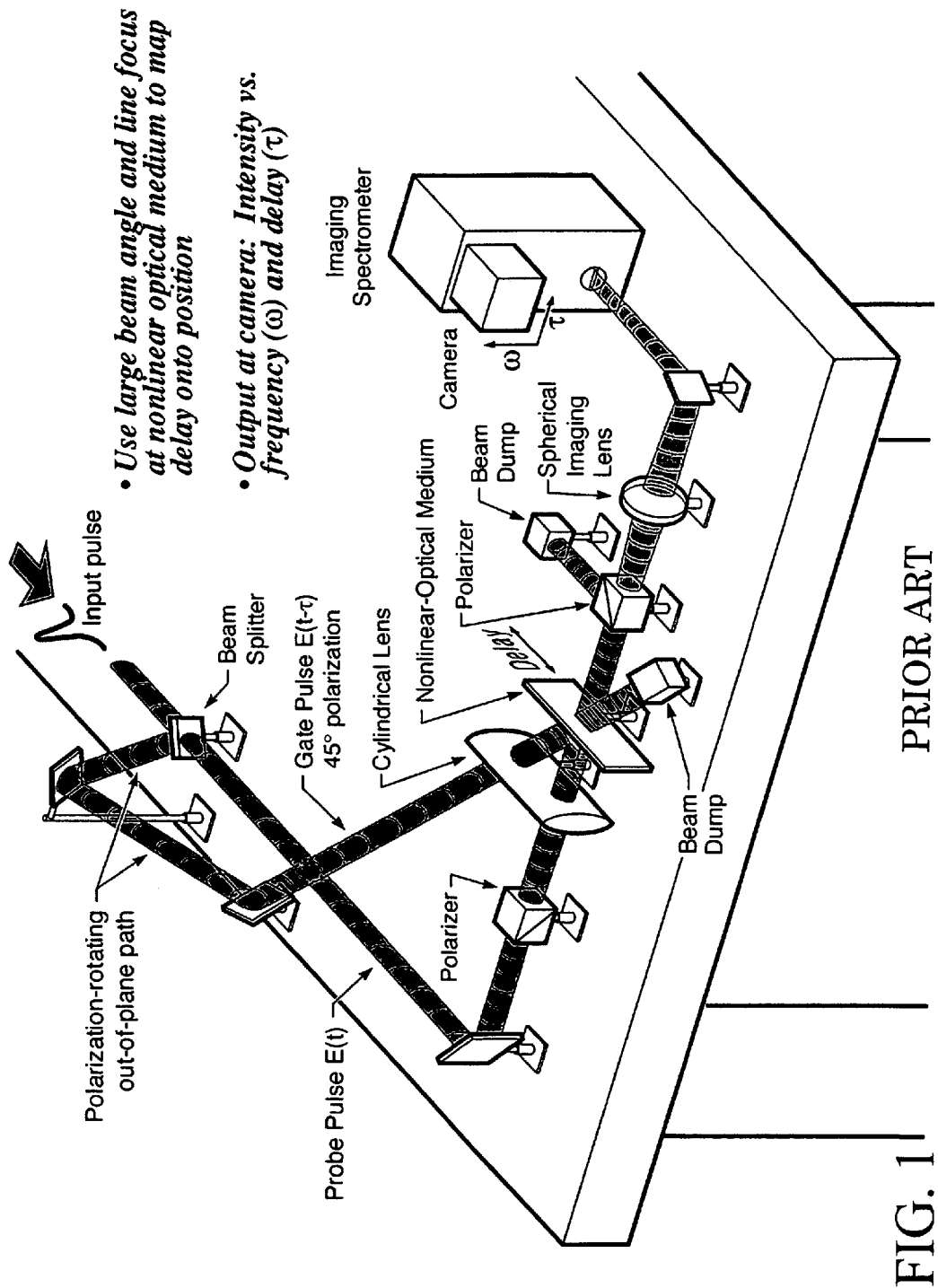
FIG. 1 illustrates that measuring the spectrogram of a pulse is easier than measuring its sonogram. A spectrogram is a spectrally resolved autocorrelation. In this figure, the optical Kerr-effect is used (polarization-gate) as the non-linearity.
Figure 2:
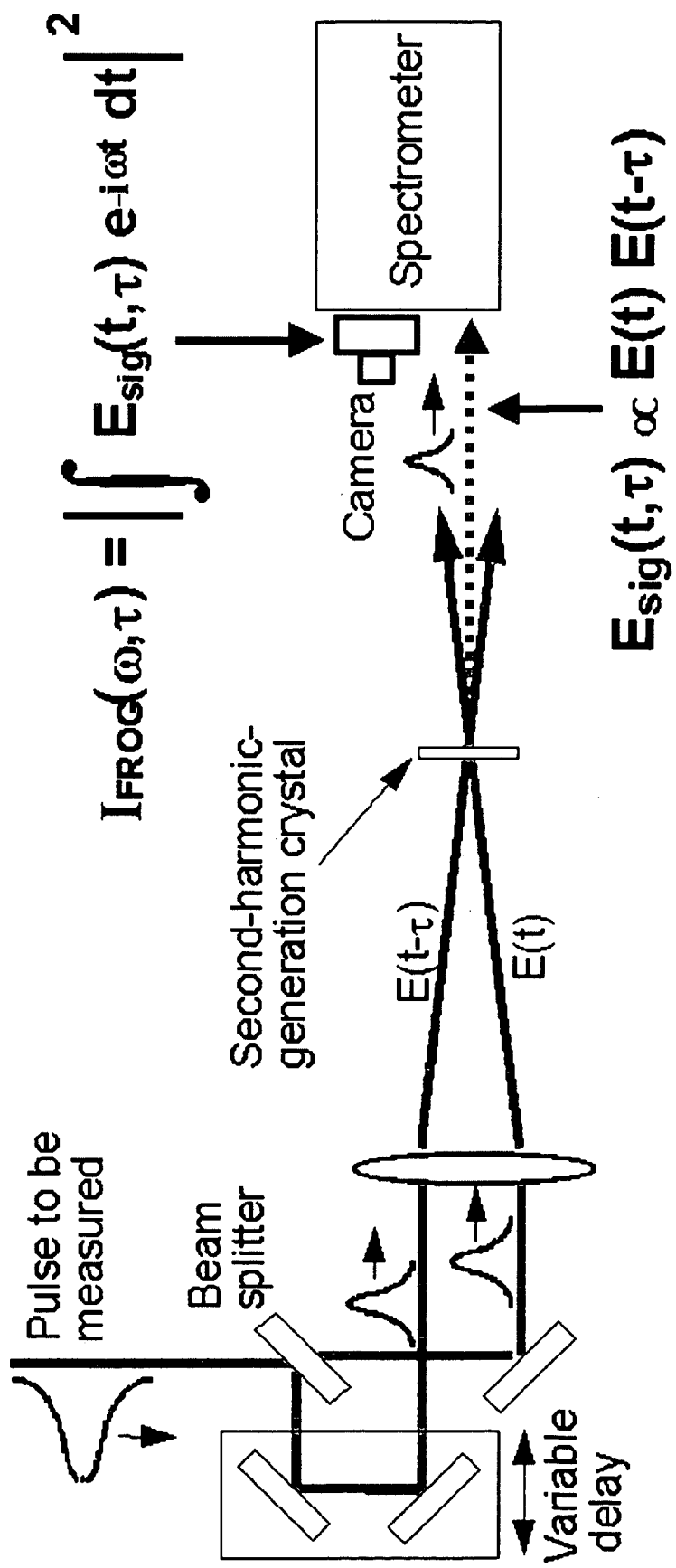
FIG. 2 shows schematically an SHG FROG device. The SHG signal from the autocorrelation is spectrally resolved. SHG FROG is very simple and sensitive, but has a direction-of-time ambiguity. For example, if the pulse has chirp, only the magnitude of the chirp is determined—the sign of the chirp remains unknown.
Figure 3:
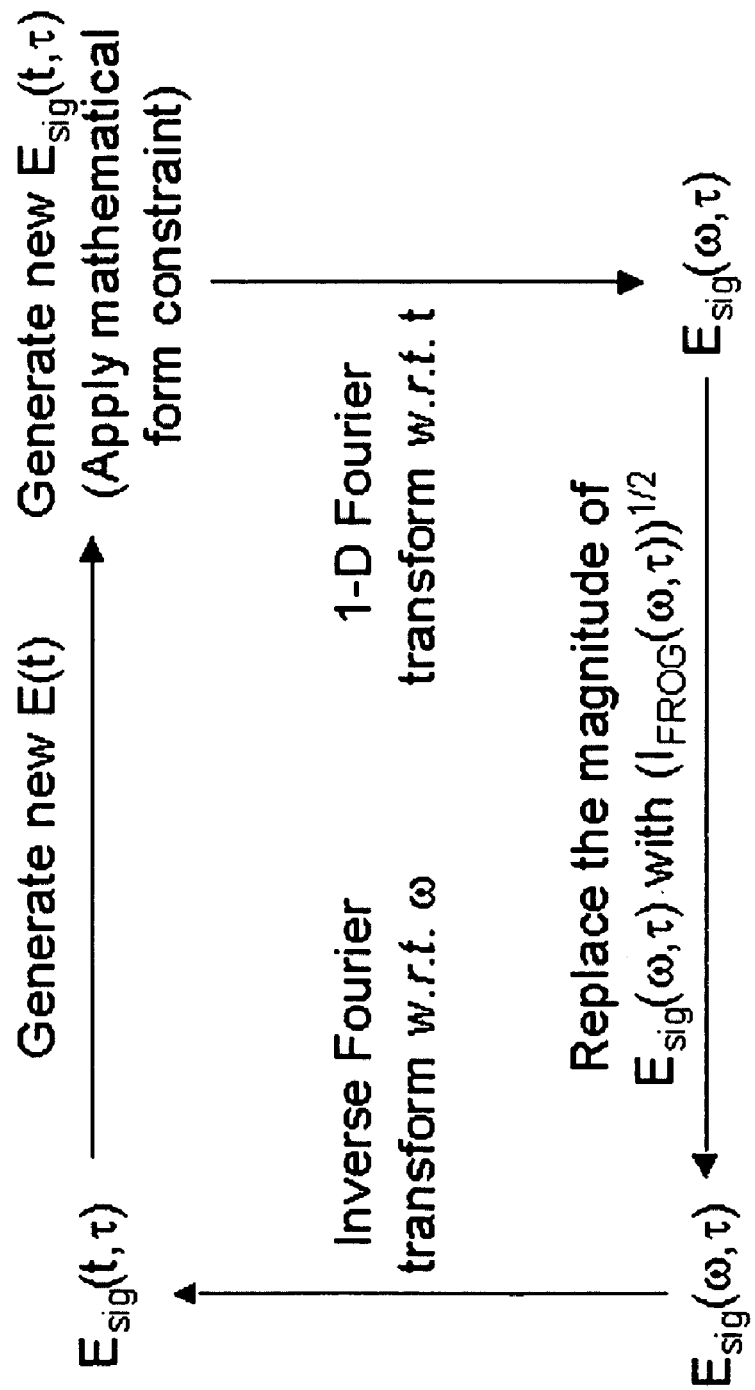
FIG. 3 illustrates phase retrieval processes for the inversion of FROG spectrograms that start with an initial guess for the pulse to generate an initial $E_{sig}(t,\tau)$. A 1-D Fourier transform generates the FROG trace. The process continues by replacing the magnitude of the calculated FROG trace with the square root of the measured FROG trace. The process takes the inverse Fourier transform with respect to $\omega$ to produce the new signal field and generate a new start value for E(t). Interestingly, it is only the process that produces E(t) from $E_{sig}(t,\tau)$ that differentiates all the FROG implementations.

Preferred embodiments of the present invention provide a real-time ultrafast laser pulse measurement method and apparatus, which overcomes the low speed of pulse measurement using frequency-resolved optical gating (FROG). Particularly preferred implementations identify stagnation, loss of tracking or other errors in a real-time pulse measurement system based on frequency-resolved optical gating. Some embodiments of the present invention preferably condition the spectrogram or FROG trace for better and more accurate phase retrievals. Other aspects of the present invention preferably calculate parameters that indicate the quality of the FROG measurement.

The PCGP phase retrieval technique discussed in the background generally converges well, but it is possible for the PCGP phase retrieval technique to stagnate, lose tracking or for other errors to develop. These errors may result from noise, unremovable background or poor calibration and may be particularly problematic for inexperienced users of the FROG system. It is also possible to use other phase retrieval strategies to provide real-time FROG, which are more prone to stagnation and errors than PCGP phase retrieval. Consequently it is preferable to provide a real time pulse measurement system that provides feedback to a user to allow identification of stagnation or other types of errors.

Preferred implementations of this real-time pulse measurement system can measure ultrafast laser pulses in real-time at rates on the order of a few Hertz, such as 3 Hz, or at even faster rates such as 20 Hz or faster. The method and apparatus preferably integrates a frequency-resolved optical gating (FROG) device with a desired phase retrieval process in a seamless way. The data signal, or FROG trace, is collected using a suitable data acquisition device such as a video camera. The video signal is digitized using a frame grabber and is displayed on the computer screen. This signal, the raw FROG trace, provides the user with an indication as to the performance of the FROG device itself. Because the raw FROG trace is a spectrogram of the pulse—a display of intensity vs. frequency and time, it also provides some indication as to the duration and frequency content of the pulse. To obtain the actual intensity and phase of the pulse, a two-dimensional phase retrieval algorithm is applied to the FROG trace.

To use the phase retrieval algorithm the raw FROG trace is resized to establish the correct relationship between the time and the frequency axis such that the frequency span is equal to the inverse of the time spacing and the time span is equal to the inverse of the frequency spacing, which is the general case for Fourier transforms.

After the FROG trace is resized, it is subjected to the FROG processing. To improve the speed of the tracking of the FROG processing, the pulse retrieved from the previous FROG trace is used as the initial guess for the new FROG trace. In this way, the FROG algorithm can be thought of as an adaptive digital filter. While the PCGP algorithm has usually been used in real-time FROG measurements, other FROG retrieval algorithms can be used as well.

Because large changes can occur in the pulse even at the retrieval rates possible using this method and apparatus, the phase retrieval process can stagnate and lose tracking of the pulse. Indeed, this can even happen if the pulse does not change. Previous real-time pulse measurement systems provide no feedback to the user to indicate a problem. In order to provide feedback to both the program and the user, preferred embodiments of the present invention provide within the preferred program implementation a calculated and/or displayed metric to indicate how well the iterative FROG process is tracking the pulse. One preferred choice and typically the simplest metric to use is the FROG trace error. High errors indicate a loss of tracking; that is, the retrieved pulse is no longer close to the true pulse. Consequently, the FROG phase retrieval process is preferably reset. A particularly preferred strategy for resetting the FROG phase retrieval process is to adopt a Gaussian pulse that has random phase as the initial guess in the process resumed after the loss of tracking or stagnation.

As previously discussed, the FROG trace error metric is proportional to the distance measurement between the FROG trace constructed from the retrieved pulse (retrieved FROG trace) and the measured FROG trace that has been resized. Typically, if the measured FROG trace is close to the retrieved FROG trace, then the distance is small, and the phase retrieval process is tracking properly. If the distance becomes large, then the phase retrieval process may be stagnated or may no longer be tracking. The distance measurement is usually the Euclidean norm of the difference between the measured and the retrieved FROG trace, divided by N, where N is the square root of the number elements in the FROG trace. Other distance related measurements can be used as the FROG trace error metric such as the sum of the absolute value of the differences (the $l_1$ norm of the difference) or the per element average of the absolute value of the differences.

While small distances (low FROG trace errors) between the measured and retrieved FROG traces usually indicate good retrievals, they are not always a complete indicator of stagnation or a loss of tracking. These quantities are subject to interpretation. For example, retrievals from large FROG traces always have smaller errors than comparable retrievals from smaller FROG traces. This usually occurs because larger FROG traces have more elements with small values than smaller FROG traces. Also, if the FROG trace is very complex and has large amounts of structure, then the FROG trace error may be higher than for a smooth, simple FROG trace even when both FROG traces are nearly the same size. For example, an acceptable FROG trace error is in the range of 0.5%–1.5% for second harmonic generation (SHG) FROG retrievals on a 64×64 grid. But errors as high as 3.5% can still yield acceptable results. If the grid size is increased to 128×128 then the acceptable error drops by a factor of 2. For polarization gate FROG, acceptable FROG trace errors are on the order of 2%. Again, for larger grid sizes, this value drops. Thus, the FROG trace error alone provides a guide to the quality of the retrieval, but is subject to interpretation.

Another way to determine if the real-time FROG device is measuring pulses correctly is to visually compare the measured FROG trace with the retrieved FROG trace. When the two FROG traces are compared side-by-side, they should appear very similar. Thus, if the measured and retrieved FROG traces appear similar and the FROG trace error is low, then the retrieval is likely of good quality. If they have the same general shape and the FROG trace error is a little high, then the retrieval is probably good. If the two traces appear very different, then the retrieval is almost certainly poor.

While it might be possible to automate such feedback and analysis, automation is quite difficult in practice. A carefully constructed neural net might be able to make a correct decision about the quality of the retrieval, but having the displays easily available for the user is presently preferred as a means of providing an indication of the quality of the retrieval and, therefore, the quality of the measured pulse. In addition, the displays provide the user with enough information to tell if the algorithm is no longer tracking the pulse.

Figure 4:
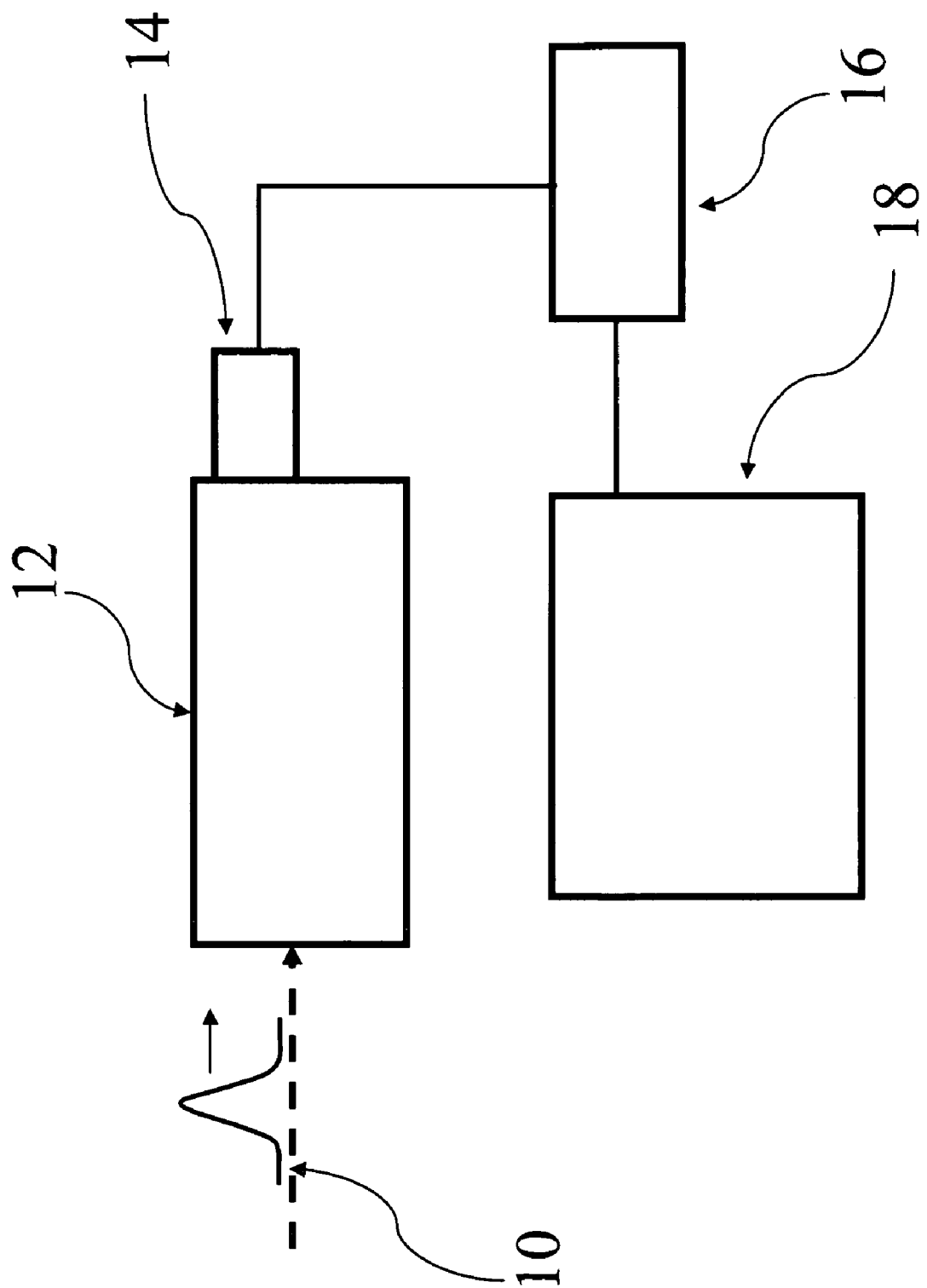
FIG. 4 is a schematic illustration of a FROG system in accordance with aspects of the present invention.

A preferred implementation of a FROG system is shown in FIG. 4. A short pulse 10, such as an ultrashort laser pulse, is sent into a frequency resolved optical gating (FROG) device 12. The spectrogram output of the FROG device is recorded using a video camera 14. The video output from the video camera 14 is digitized by a frame grabber 16, and sent into the computer 18, where the data are analyzed and displayed for the user. FROG processing and phase retrieval are preferably accomplished in computer 18, which preferably implements the PCGP technique described in U.S. Pat. No. 6,219,142, which is incorporated by reference in its entirety for all of its teachings related to FROG phase retrieval and FROG apparatus.

It should be appreciated that the various preprocessing and feedback strategies described here are preferably implemented in conjunction with the PCGP phase retrieval technique in a FROG system. It should further be appreciated that the preprocessing and feedback strategies described here can also be implemented advantageously in FROG implementations that do not use the PCGP technique. In fact, aspects of the present invention are expected to have even greater benefits in FROG implementations that do not use PCGP techniques.

Figure 5:
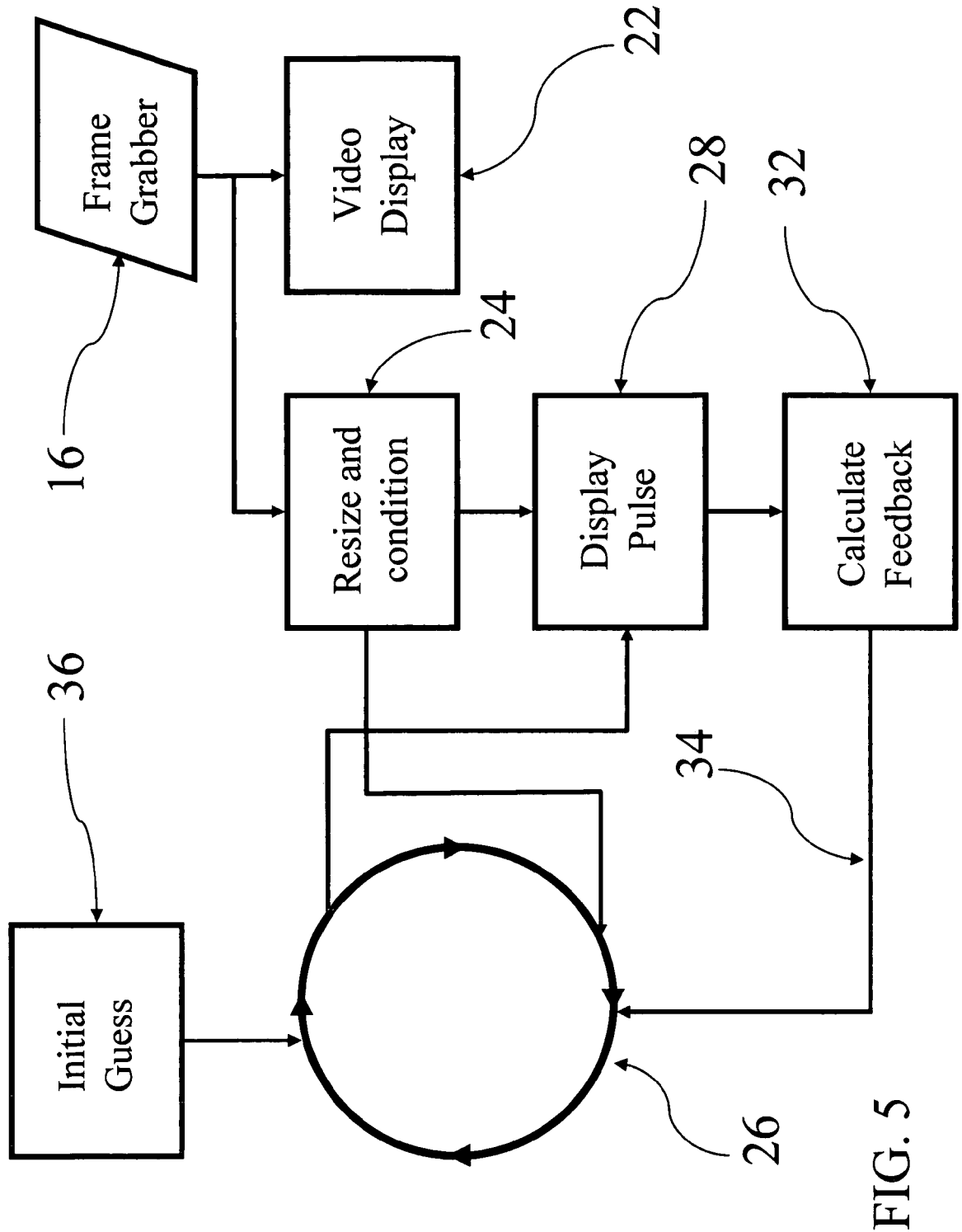
FIG. 5 illustrates the display and preprocessing of raw FROG data, along with the iterative phase retrieval process used to characterize a high-speed laser pulse. According to preferred aspects of the present invention, the illustrated FROG system provides an indication of feedback that can be used to identify an error condition and one of the responses to an error condition, restarting phase retrieval using a new form of initial guess.

The analysis process is shown in FIG. 5. FIG. 5 shows the display and preprocessing of raw FROG data, along with the iterative phase retrieval process used to characterize the pulse. According to preferred aspects of the present invention, the illustrated FROG system provides an indication of feedback that can be used to identify an error condition and one of the preferred responses to an error condition, restarting phase retrieval using a new form of initial guess. Data obtained by the frame grabber 16 (also shown in FIG. 4) are provided to the computer 18 (FIG. 4) for processing and display. The computer both displays 22 (FIG. 5) and conditions 24 the raw data for the iterative two-dimensional phase retrieval process 26. Prior to sending the new conditioned data 24 to the iterative retrieval process 26, the results from the previous iteration are extracted and displayed 28.

A feedback parameter is calculated 32 and fed back 34 to control the phase retrieval process 26. One possible option for control is to reset the phase retrieval process by using a new initial guess 36, for example using a Gaussian pulse that has random phase as the initial guess 36 in the process resumed after the loss of tracking or stagnation. Another strategy is for the program to alter the phase retrieval process, for example by introducing a small, random or predetermined, perturbation into the then-current parameters of the phase retrieval process and starting another iteration using the perturbed information.

Another sort of action that might be taken in response to the feedback signal is for the system to generate an alarm or alert error indication. Generally a visual alarm or alert is preferred, although an audible alarm or alert may alternately be used or may be used in addition to a visual indication.

The feedback parameter 34 for control of the algorithm 26 can be one or more of several different parameters. It could be the FROG trace error where if this error is too great, the phase retrieval process has lost track and must be reset. As discussed above, a FROG trace error metric used as the feedback parameter may be proportional to the distance measured between the FROG trace constructed from the retrieved pulse and the measured FROG trace that has been resized. Any distance related measurement could be used. Usually the Euclidean norm, divided by the square root of the number of elements in the FROG trace, is used.

A different feedback parameter 34 could be a comparison of the conditioned measured FROG trace with the trace constructed from the retrieved pulse, which is called the retrieved FROG trace. As discussed above, this comparison is preferably provided directly to the display of the computer, where a skilled user can efficiently determine the status of the phase retrieval process.

The feedback parameter 34 could also be a metric measuring the amount of background removed by background subtraction. For this background-related feedback parameter, the parameter preferably identifies conditions where too much background has been removed and conditions where the background in the signal is too high. This background-related feedback parameter is discussed in greater detail below.

Figure 6:
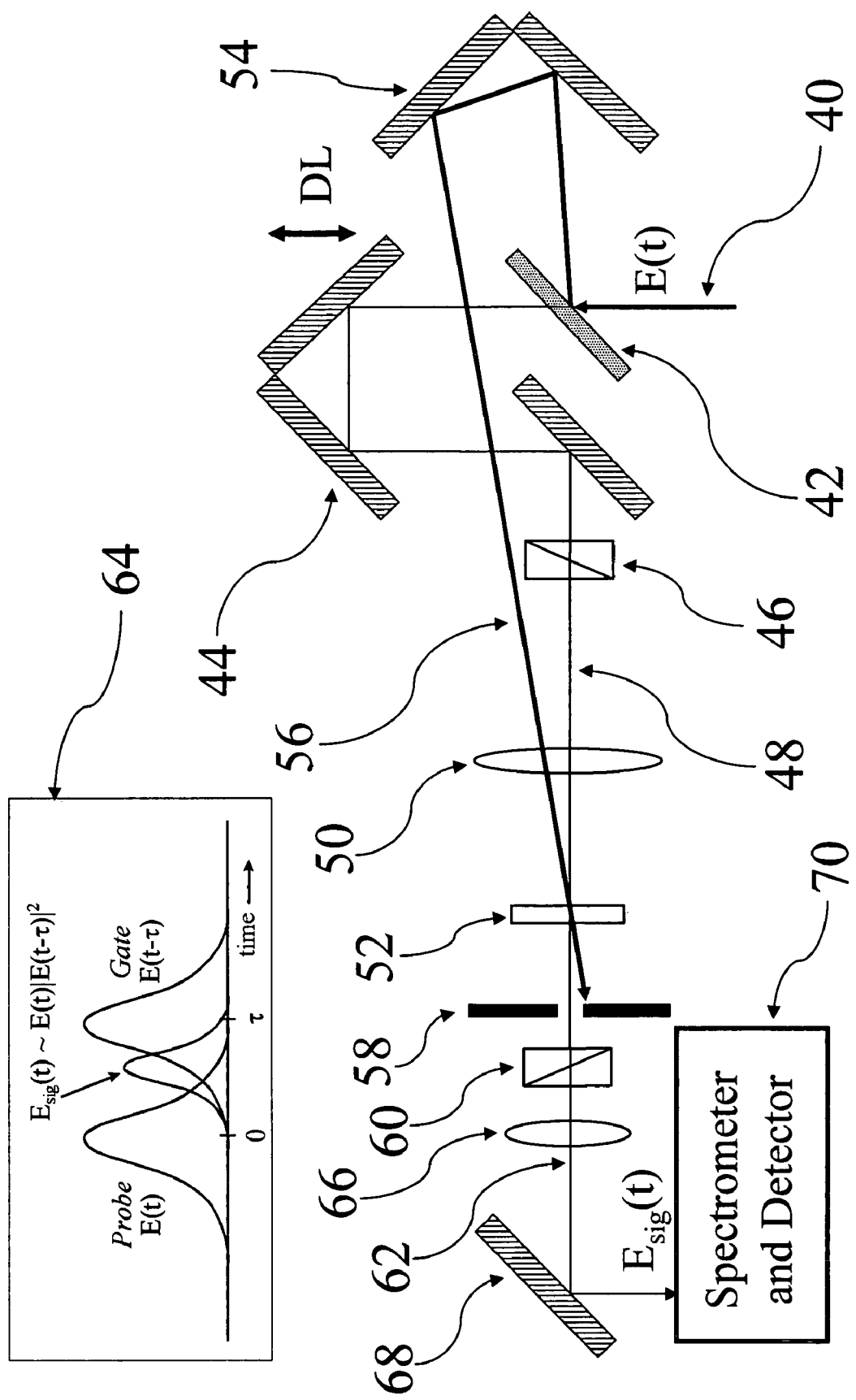
FIG. 6 illustrates the optical path for an exemplary polarization gate FROG device that could be used in the FROG system of FIG. 4.

FIG. 6 illustrates the optical path of a polarization gate FROG device 12 (FIG. 4) that might be used in the FROG system of FIG. 4. An ultrafast laser pulse 40 to be characterized is provided to the FROG device and is split by a beam splitter 42. A portion of the input pulse 40 passes through the beam splitter 42 and is directed by mirrors including retroreflector 44 through a first polarizer 46, which polarizes the probe portion 48 of the pulse. A spherical lens 50 focuses the polarized portion 48 of the pulse onto a non-linear medium 52. Typically the non-linear medium 52 is quartz. Mirror 54 directs the portion of the input pulse 40 that is split off and reflected from the beam splitter along an optical path so that lens 50 focuses this gate portion of the pulse 56 onto the non-linear medium 52.

Two resulting pulses 48, 56 form the probe and time delayed gate pulses that are combined by the non-linear medium 52. The gate pulse 56 produces a birefringence in the nonlinear material 52, which causes the polarization of the probe pulse 48 to rotate slightly allowing the signal pulse 62 to pass through polarizer 60 that is crossed relative to the input polarizer 46. A spatial filter 58 and the polarizer 60 remove unwanted portions of the initial pulses to produce the signal pulse 62 shown conceptually in the inset 64. The inset 64 shows the temporal relation between the probe, signal and gate pulses, as well. Lens 66 and mirror 68 direct the signal pulse 62 into the spectrometer and detector 70 that produces the two-dimensional spectrogram of the signal pulse. Video camera 14 (FIG. 4) and frame grabber 16 (FIG. 4) capture the spectrogram for phase retrieval processing as discussed above.

Figure 7:
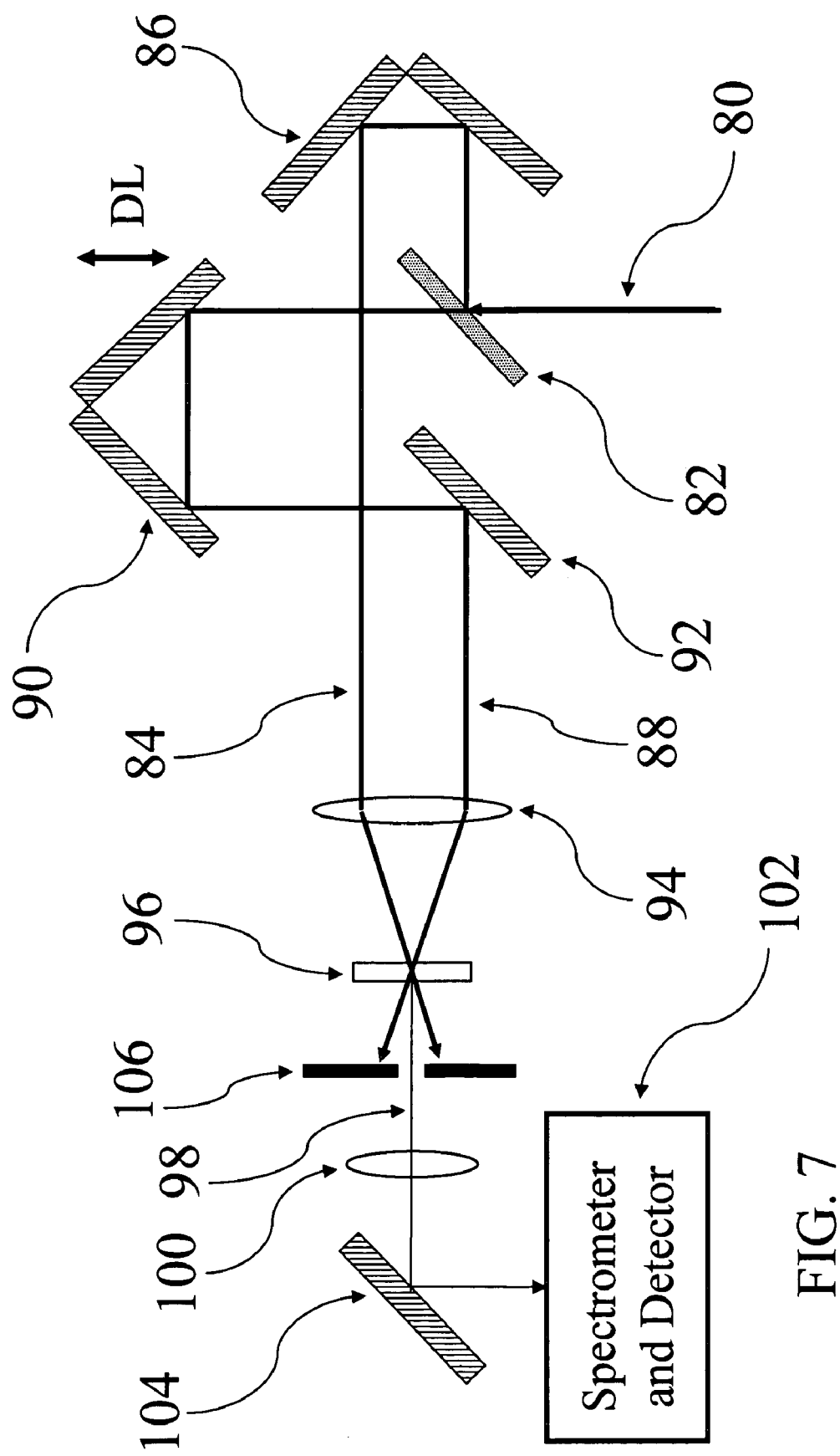
FIG. 7 illustrates the optical path for an exemplary second harmonic generation (SHG) FROG device that could be used in the FROG system of FIG. 4.

FIG. 7 illustrates the optical path of a second harmonic generation (SHG) FROG device 12 (FIG. 4) that might be used in the FROG system of FIG. 4. An input pulse 80 enters the second harmonic generation FROG device and is split into two replicas by a beam splitter 82. One pulse, which is deemed the gate pulse 84, is retro reflected by two mirrors 86. The other replica, the probe pulse 88 is sent to a movable delay stage 90. A mirror 92 directs the probe pulse 88 through a spherical lens 94 that focuses both the probe pulse 88 and the gate pulse 84 into a nonlinear crystal 96 suitable for second harmonic generation. The probe pulse 88 and the gate pulse 84 sum in the nonlinear crystal 96 to produce the signal pulse 98. A spherical lens 100 images the signal pulse 98 onto the slits of a spectrometer 102. An optional mirror 104 helps to direct the signal pulse 98 into the spectrometer 102. An iris 106 prevents any stray second harmonic light generated by the probe and gate pulses from entering the spectrometer 102 and corrupting the signal pulse 98. The detector records the spectra as a function of delay to produce the FROG trace, which is subjected to phase retrieval processing as discussed above.

The preceding discussion has emphasized errors associated with stagnation or loss of tracking and the use of feedback to address these errors. FROG trace retrievals are also subject to other issues that affect the retrieval quality. An important problem with FROG retrievals is the deleterious effect noise in the wings of the measured FROG trace can have on the retrieved pulse. Such noise can cause artifacts in the retrieved pulse and can lower the dynamic range of the measurement. While these artifacts are most noticeable in the wings of the pulse, where the pulse intensity is small, these background-induced artifacts occur randomly anywhere on the pulse.

Several strategies can be used to mitigate background effects. One way is to tailor the camera response such that the camera is very responsive to low light levels and less responsive to high light levels. Such a response is already available on video cameras in the form of the gamma compensation or correction function. Video cameras provide gamma correction to compensate for the non-linear response of phosphors in cathode-ray tubes (CRTs). Gamma correction is an analog processing that is implemented in certain aspects of the invention to condition the FROG trace for processing in a manner that improves the dynamic range of the data.

When the gamma correction is engaged, the recorded intensity is approximately the light intensity raised to a fractional power, $R=I^\gamma$, where R is the response, I is the light intensity on the camera, and $\gamma$, or "gamma" is the gamma correction. The true light intensity on the camera is then $I=R^{1/\gamma}$. When gamma is less than 1, the gamma correction has the effect of increasing the range of the signal and suppressing any low level noise, which usually appears in the wings of the FROG trace. The industry standard gamma is 0.45, close to 0.5. Indeed, early real-time pulse retrieval devices used this to provide an analog calculation of the square root of the intensity, which is required by the phase retrieval algorithm.

Actual gamma corrections on cameras are not 0.45, however. They are usually closer to 0.6–0.7 even when they are specified to be 0.45. Consequently, one cannot assume the gamma is exactly 0.45 or 0.5. The true gamma is preferably measured and the exact inverse of the gamma is most preferably applied to the recorded signal. However, even though the gamma correction cannot be used as an estimate of the square root of the intensity, it can be used to suppress the effect of noise in the wings of the FROG trace. Thus, implementations of the present invention that utilize this aspect of the invention preferably utilize a gamma correction in the video camera (14 in FIG. 4). The level of gamma correction is measured and the actual gamma correction is preferably stored for future uses by the preferred program implementations of this aspect of the present invention. The gamma correction preferably is reversed in a calculation within the computer to produce the original intensity distribution of the FROG trace before phase retrieval processing. Preferably, the use of gamma correction is selectable by the user through the user interface of the computer.

Another way the effect of noise can be mitigated is to filter the FROG trace. Generally this filtering is done in the computer 18 prior to phase retrieval processing, but it is possible to implement the filtering in different ways including within the frame grabber. One useful type of filter that can be used to remove speckle noise in the wings of the FROG trace is the median filter. A median filter works by replacing the center of a small sub-region of the image by the median of the values in the sub-region. This is accomplished by ordering the values in a small (N×N) sub-region of an image or matrix from lowest to highest (or vice versa). If N is an odd number, the total number of points is odd, and the middle value in the ordered sequence is by definition the median value. The sub-region is moved over the entire image so that every point of the image is filtered. If the center point of the sub-region is on the edge of the matrix or image, then wrapping the image—using points from opposite sides of the matrix, can fill in points in the sub-region. Alternatively, fixed values, such as zero, can be added to the sides of the image to fill the sub-region when it is on the edge of the image.

Another type of filter that can be used is a rank filter. Rather than choose the median, or middle value, of an N×N sub-region of the image, a value with lower or higher rank is chosen, such as the lowest value, the next to lowest value, the highest value, etc. In addition, a modification of the rank filter determines if the center point of the sub-region is closer to the lowest or highest value in the sub-region. If the point is closer to the highest value, it is replaced by the higher value. Alternatively, if it is closer to the lowest value, it is replaced by the lowest value.

For purposes of filtering FROG traces, it is often best to make the rank filter adaptive by applying the rank filter for only certain values of the FROG trace. Most often, the FROG trace needs to be filtered by a rank filter when the values are low. When the rank filter is made adaptive in this manner, it requires two numbers to be specified: the rank and the threshold. If the sum of the values in the sub-region is greater than the threshold, nothing is done. Conversely, if the sum of the values in the sub-region is less than the threshold, the center value of the sub-region is replaced by the value with the appropriate rank. Preferably, the use of any of these filter functions is selectable by the user through the user interface of the computer.

This filter is not only useful for FROG traces, but it is also useful for situations where noise in the wings of an image interferes with a calculation. Most notably, noise in the wings of an image of a laser beam interferes with the calculation of the second moment of the laser beam, which is often used to specify the diameter of the laser beam. Any noise or speckle in the wings of the beam image (profile) may cause the second moment calculation to have an error of several percent.

Because background has such deleterious effects on the retrieval of the pulse from its FROG trace, users tend to remove too much background, causing errors in the retrieved pulse. Thus, another important tool in improving the quality of FROG trace retrieval is the ability to determine if too much background has been removed from the measured FROG trace.

Typically, the FROG trace does not go directly to zero around its perimeter; it asymptotically approaches zero. If the data acquisition were perfect, then these wings would be visible and noise free. However, data acquisition devices have detection limits and the wings of the FROG trace may fall under these limits. Background removal may further exacerbate this problem to the point where significant portions of the FROG trace are removed and, as a result, the retrieval can appear to be non-physical.

When significant amounts of background are missing from a FROG trace, the remaining FROG trace can be thought of as a cap on the true FROG trace. That is, if the measured FROG trace is superimposed on the true FROG trace, then while the peak(s) of the measured and true FROG trace would coincide, the measured FROG trace would not reach the wings of the actual FROG trace and the edge of the measured FROG trace would sit above the bottom of the true FROG trace by some amount $\beta$. This can be visualized by thinking of a mountain surrounded by an ocean where ocean level represents the detection limit of the data acquisition device. The portion of the mountain above the ocean represents the measured FROG trace while the entire mountain represents the true FROG trace. The distance between the surface of the ocean and the base of the mountain is $\beta$.

Typically, when the phase retrieval process is applied to the measured FROG trace, the retrieved pulse is such that the retrieved FROG trace more closely approximates the true FROG trace than the measured FROG trace. That is, the retrieval process fills in some of the wings clipped from the measured FROG trace. If the measured FROG trace is then normalized to the retrieved FROG trace such that the two heights are the same, the FROG trace error will be abnormally high because portions of the measured FROG trace are zero when they should actually be non-zero.

However, if $\beta$ is added (e.g., in computer 18 of FIG. 4) to the measured FROG trace before the height of the measured FROG trace is normalized to the height of the retrieved FROG trace, and the error is only calculated using points where the measured FROG trace is non-zero, the FROG trace error will drop. Indeed, an estimate for $\beta$ can be found by finding the offset that produces the lowest FROG trace error.

Feedback to the user is not just useful as an indication of measurement and system function. Feedback can also be used to adjust the ultrafast laser source for optimum performance. To facilitate the feedback, information from the retrieved pulse may have to be conditioned. For example, in order to amplify ultrafast laser pulses, the ultrafast laser pulses is preferably lengthened in time, which is accomplished by chirping the pulse using a pulse stretcher. After amplification, a pulse compressor recompresses the pulses. Because the stretcher and compressor must be closely matched, they are usually similar in design. Typically, the stretcher and compressor are made by dispersing a beam off a grating using a focusing element to collimate the light to another focusing element that focuses the beam back onto another grating before being output.

The distance between the gratings determines the group velocity dispersion, or linear chirp. Third order dispersion is a function of the difference between the gratings angle used in the system. Adding prisms to the system can compensate for fourth order dispersion. From the frequency domain phase, the amount of group velocity dispersion, as well as all higher order dispersion terms can be found and displayed for the user or the information can be used to automatically adjust the stretcher-compressor system. The information could also be sent to the factory, electronically or otherwise, to assist with maintenance or as a diagnostic of the ultrafast laser amplifier.

Real time as it is used in this application means a rate of at least one Hertz. Rates of 3 Hz or faster are more preferred real time implementations to provide a useful rate of update and rates of 10 Hz or better are further preferred. As discussed above, rates of 20 Hz or faster are achievable in particular preferred embodiments of the present invention and that update rate is a still further preferred update rate at the present time.

Useful information is not just limited to the frequency domain, or spectral phase of the pulse. Time domain phase can be used to determine spectral loss of the pulse due to clipping of the beam within the stretcher-compressor.

This device may be used for measuring light pulses in telecommunications systems as well.

Although the present invention has been described in detail with reference only to the presently preferred embodiments, those of ordinary skill in the art will appreciate that various modifications can be made without departing from the invention. Accordingly, the invention is not to be limited to any of the described embodiments thereof but is instead defined by the following claims.

What is claimed is:

1. A method for real-time measurement of ultrashort laser pulses comprising:
   recording in a computer measured frequency resolved optical gating (FROG) trace data generated by processing a pulse in a FROG device;
   processing the measured FROG trace to perform real time phase retrieval and generating in real time a retrieved pulse from the measured FROG trace;
   displaying the retrieved pulse;

generating in real time a feedback parameter providing information characterizing the real time phase retrieval; and providing the feedback parameter to a user or to a FROG process.

2. The method of claim 1 where the feedback parameter is the FROG trace error.

3. The method of claim 1 where the feedback parameter is a display of the measured and retrieved FROG traces.

4. The method of claim 1, where the real time phase retrieval uses a previous result as a starting point for a subsequent retrieval.

5. The method of claim 1, further comprising determining a background correction factor providing a minimum FROG trace error.

6. The method of claim 1, further comprising:
recording a signal pulse with a camera, the signal pulse generated within the FROG device from the pulse, the camera performing gamma correction;
producing the measured FROG trace from output of the camera; and
preprocessing the measured FROG trace to reverse the gamma correction implemented during measurement of the measured FROG trace.

7. The method of claim 1, further comprising filtering the measured FROG trace to reduce a magnitude of artifacts in the measured FROG trace prior to the real time phase retrieval processing.

8. The method of claim 1, further comprising analog processing of a spectrogram corresponding to the pulse, the analog processing prior to generating the retrieved pulse.

9. The method of claim 1, wherein the real time phase retrieval comprises principal component generalized projections processing.

10. The method of claim 1 where the feedback parameter is provided to the use and to a FROG process.

11. The method of claim 1 where the feedback parameter is provided to the user through a display.

12. A method of performing real time phase retrieval processing of frequency resolved optical gating (FROG) traces, the method comprising:
receiving as input a measured FROG trace data set, the FROG trace data set generated by processing a pulse in a FROG device;
processing the measured FROG trace data set to perform real time phase retrieval and generating in real time a retrieved pulse from the measured FROG trace;
generating displaces of the retrieved pulse at a rate of 3 Hz or faster;
generating a feedback parameter providing information characterizing the real time phase retrieveal; and
providing the feedback parameter to a use or a FROG retrieval.

13. The method of claim 12, wherein the method is embodied in a computer program product.

14. The method of claim 13, further comprising selectively preprocessing the measured FROG trace data set to apply a reverse gamma correction to the measured FROG trace data set.

15. The method of claim 12 where the feedback parameter is provided to the user and to a FROG retrieval.

16. The method of claim 12 where the feedback parameter is provided to the user through a display.

17. A method of performing real time phase retrieval processing of frequency resolved optical gating (FROG) traces, the method comprising:
receiving as input a measured FROG trace data set, the FROG trace data set generated by processing a pulse in a FROG device;
processing the measured FROG trace data set to perform real time phase retrieval and generating in real time a retrieved pulse from the measured FROG trace;
generating in real time a display of the retrieved pulse; and
generating in real time a feedback parameter providing information characterizing the real time phase retrieval; and
performing a control operation in response to the feedback parameter.

18. The method of claim 17, wherein the control operation comprises restarting the phase retrieval process.

19. The method of claim 18, wherein the restarting the phase retrieval process takes as an input a Gaussian pulse having random phase.

20. The method of claim 17 where the feedback parameter is the FROG trace error.

21. The method of claim 17 where the feedback parameter is a simultaneous real time display of the measured and retrieved FROG traces.

22. The method of claim 17, further comprising selectively filtering the measured FROG trace data set prior to the real time phase retrieval processing, the selectively filtering responsive to user inputs.

23. The method of claim 17, further comprising selectively analog processing a spectrogram corresponding to the pulse, the selectively analog processing prior to generating the retrieved pulse.

24. The method of claim 17, further comprising selectively preprocessing the measured FROG trace data set to apply a reverse gamma correction to the measured FROG trace data set.

25. The method of claim 17, wherein the measured FROG trace data set is received from a frame grabber.

* * * * *

UNITED STATES PATENT AND TRADEMARK OFFICE
CERTIFICATE OF CORRECTION

| | | |
|---|---|---|
| PATENT NO. | : 7,130,052 B1 | Page 1 of 1 |
| APPLICATION NO. | : 10/808010 | |
| DATED | : October 31, 2006 | |
| INVENTOR(S) | : Daniel James Kane | |

It is certified that error appears in the above-identified patent and that said Letters Patent is hereby corrected as shown below:

In claim 10, at column 15, line 36, delete "use" and replace with --user--.

In claim 12, at column 15, line 48, delete "displaces" and replace with --displays--.

In claim 12, at column 15, line 52, delete "use" and replace with --user--.

Signed and Sealed this

Fifteenth Day of February, 2011

David J. Kappos
*Director of the United States Patent and Trademark Office*